J. F. GEYER.
MACHINE FOR FILLING BOTTLES, &c.
APPLICATION FILED SEPT. 1, 1917.

1,401,150.

Patented Dec. 27, 1921.
3 SHEETS—SHEET 1.

Witness
Harold Straus

Inventor
John F. Geyer
By
Attorney

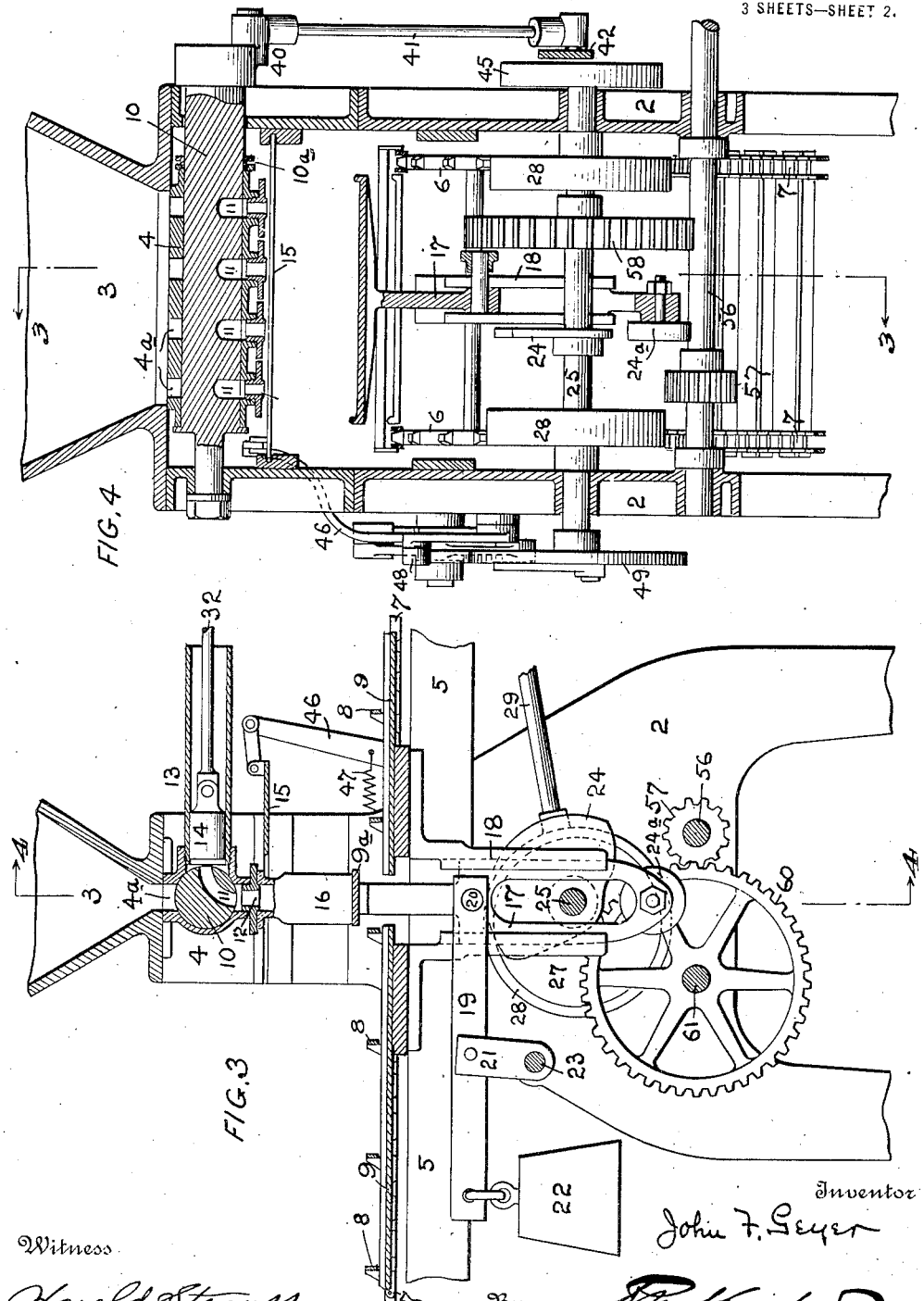

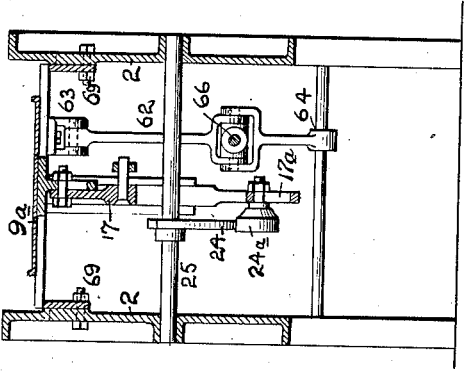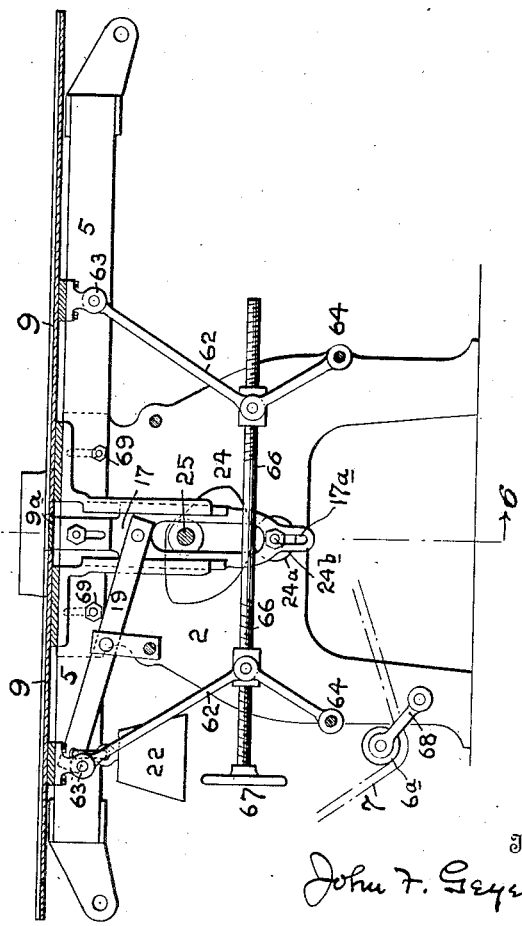

UNITED STATES PATENT OFFICE.

JOHN F. GEYER, OF PHILADELPHIA, PENNSYLVANIA.

MACHINE FOR FILLING BOTTLES, &c. REISSUED 1,401,150. Specification of Letters Patent. Patented Dec. 27, 1921.

Application filed September 1, 1917. Serial No. 189,304.

*To all whom it may concern:*

Be it known that I, JOHN F. GEYER, a citizen of the United States, and resident of Philadelphia, county of Philadelphia, and State of Pennsylvania, have invented an Improvement in Machines for Filling Bottles, &c., of which the following is a specification.

The object of my invention is to provide a suitable machine for accurately and rapidly filling bottles, jars, cans and similar vessels with material of a more or less viscous character, such as jellies, preserves, etc., which are sluggish in flow, and especially where the passages are relatively small.

My object is further to provide an automatic machine in which the material to be delivered to the vessels is positively sucked out of the hopper or container and then forced in a positive manner into the bottle, jar or other receptacle positioned to receive it, the construction being such that the material is positively handled irrespective of its density or resistance to flow under gravity. My object is further to positively withdraw the material from the container or hopper in such manner as to deliver it to the bottle, jar, etc. in measured quantities, the machines preferably having capacity for adjusting the quantity to suit bottles, jars, etc., of different dimensions.

A further object of the invention is to provide automatic means for conveying the bottles or jars in an intermittent manner under the control of a conveyer and automatically raising the bottles or jars in sets to the delivery apparatus for the material with which they are to be filled, the said mechanism automatically providing for bottles or jars of different heights and insuring the necks thereof in all cases being brought close to the filling nozzles.

My invention also consists of improvements hereinafter described whereby the above objects and results are attained, said improvements comprising certain organization and combination of parts which are fully described hereinafter and more particularly defined in the claims.

For the purpose of illustrating my invention, I have shown in the accompanying drawing the embodiment thereof which is at present preferred by me, since the same is in form to give satisfactory and reliable results, but it is to be understood that the several instrumentalities of which my invention consists, can be variously arranged and organized and that my invention is not limited to the precise arrangement and organization of the instrumentalities herein shown and described.

Figure 1:
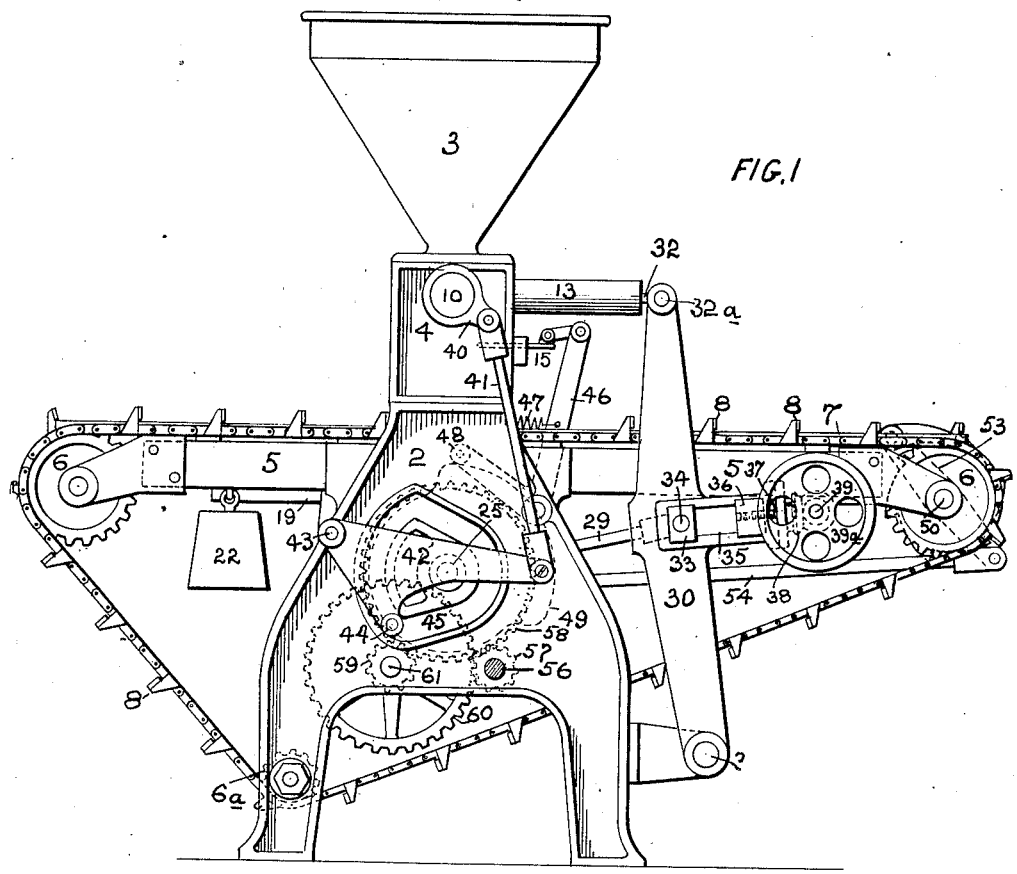
Figure 2:
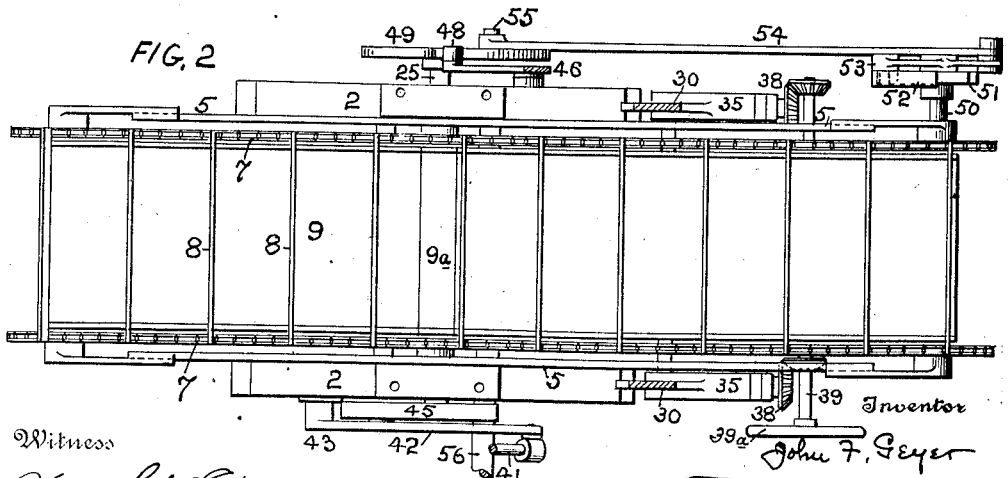

Referring to the drawings, Figure 1 is a side elevation of a machine embodying my improvements; Fig. 2 is a plan view of the same with the hopper and filling machinery removed; Fig. 3 is a longitudinal sectional elevation of a portion of the machine taken on line 3—3 of Fig. 4; Fig. 4 is a transverse sectional elevation taken on line 4—4 of Fig. 3; Fig. 5 is a longitudinal sectional elevation of a portion of the machine indicating the construction when modified to provide vertical adjustment to the table; and Fig. 6 is a transverse section of the same taken on line 6—6 of Fig. 5.

2 is the main frame and may be of any suitable construction; 3 is the hopper or container for the materials to be handled; and 4 is the valve mechanism for controlling the said material. The main frame 2 is provided with an extended frame 5 at each side and supporting table portions 9 upon which the vessels to be filled are placed and over which they are moved by transverse bars 8 of sprocket chain 7. There are two of these sprocket chains, one at each side of the table portion 9, and said chains are guided over sprocket wheels 6, 6, at the opposite ends of the frames 5. Additional sprocket wheels $6^a$ are provided to control the sprocket chains at their lower portions to guide them about the other machinery, as will be understood by reference to Fig. 1. The sprocket wheels at the right hand end of the machine, Fig. 1, are secured to a shaft 50, and upon said shaft is journaled a rocker arm 53, one end of said arm having a pawl 52 which engages a ratchet wheel 51 secured to the sprocket shaft 50. The other end of the rocker arm 53 is hinged to a link 54 which is operated by a crank pin 55 on the rotating cam 49. In this manner, the rotation of the crank 55 will cause the sprocket shaft 50 to be intermittently rotated, each movement being equal to the distance between two of the transverse bars 8 thereof. The intermittent feeding of these sprocket chains may be performed in any other suitable manner if so desired.

Referring to the mechanism 4 for handling the viscous material to be delivered from the hopper 3 to the bottles or receptacles, there is provided a valve body bored out to receive a rotary cylindrical valve 10 which is provided with a plurality of curved passages 11. 10$^a$ is a stuffing-box at one end of the body about the valve. The body casting 4 is provided with inlet throats 4$^a$ at the top for delivering the material from the hopper 3 into the curved passages 11 when the valve 10 is rotated through ninety degrees, at which time one end of the passages 11 will be directed to the throats 4$^a$ and the other end will be directed horizontally into the end of the cylinders 13. These cylinders extend laterally from the body casting 4 and are provided with plungers 14. When the cylinder 10 is turned through ninety degrees from the position shown in Fig. 3, and the plunger 14 is drawn outwardly or to the right, the material from the hopper will be sucked through the passages 11 and into the cylinders 13, and to an extent commensurate with the length of movement of the said plungers. When this operation has taken place, the cylinder 10 is returned through ninety degrees to the position indicated in Fig. 3, and then the plungers 14 are moved inward or to the left and positively force the contents of the cylinders through the passages 11 and downward into the receptacles 16 which are at that time in position to receive the material. In this manner the material is positively handled and no dependence upon gravity action is required, and hence the machine is excellently adapted for the handling of jellies and preserves of a viscous character. The bottom portion of the body 4 of the valve device is provided with the outlet nozzles 12 screwed into place and each having an annular flange against which the neck or inlet portion of the bottle, jar or other receptacle is adapted to be pressed in contact during the act of filling. Immediately below these nozzles 12 a sliding cut-off plate 15 is provided. This plate is guided at each side in the main frame and is moved horizontally by a pivoted rocker arm 46 moved in one direction by a spring 47 and in the other direction by a cam 49 acting upon a roller 48 at the other end of said rocker arm 46. The shape and position of the cam are such that when the bottles or receptacles 16 are being brought up into position to be filled, the plate 15 moves to one side as shown in Fig. 3. When the bottles 16 have been filled and are being lowered, the plate 15 is moved inward below the nozzles and prevents any drippings from falling upon the bottles below and soiling them. The tendency to dripping would vary with the different materials being handled. In some materials there would be no tendency to dripping at all, while in other cases there might be some tendency, and it is for this reason that this drip shield plate 15 is employed. While I have shown a reciprocating plate, it is manifest that this drip catcher may be arranged in other suitable ways so as to be shifted into and out of position at properly timed intervals.

In respect to the operation of the plungers 14, the following mechanism is employed: The plungers are each provided with operating rods 32 which at their outer ends are connected to a transverse rod 32$^a$ connected to the free ends of the levers 30. These levers are arranged one at each side of the machine and are hinged at the bottom to a transverse shaft 31. Intermediate of their ends these levers 30 are provided with slotted portions 35 in which are arranged two blocks, namely a sliding block 33 and an abutment block 36. The sliding block 33 of the two levers is connected by a transverse shaft 34, and this shaft is connected by hinged arms 29 extending from the eccentric straps 28 which are operated by the eccentrics 27, said eccentrics being secured to the rotating shaft 25. When the eccentrics reciprocate the shaft 34 and the blocks 33, no action upon the levers 30 takes place until the blocks 33 abut the blocks 36, and then in the balance of the movement of the eccentric straps, the levers 30 are operated to move the plungers 14 to the right (Fig. 3). A continued movement of the eccentrics then moves the blocks 33 forward or to the left (Fig. 1), and the levers 30 remain stationary until the blocks 33 reach the end of the slots 35, and thereupon, the levers 30 are moved in the reverse or left direction back to the position indicated in Fig. 1. In this manner the plungers of the cylinders 13 are given an intermittent reciprocation and the extent of this reciprocation may be adjusted by varying the maximum distance between the blocks 33 and 36. To adjust the abutment block 36, I provide an adjusting screw 37 which may be operated by miter gears 38 from a shaft 39 having the hand wheel 39$^a$. By adjusting this hand wheel and the blocks 36 thereby, the apparatus may be adjusted so that the plungers 14 will draw any definite amount of material desired from the hopper with each reciprocation to properly fill the bottles, jars or receivers of any definite cubical capacity. I have shown and described the character of mechanism for securing this adjustment which I have found well adapted to the purpose, but it is to be understood that I do not limit myself to these devices, as any other suitable manner of controlling the extent of movement of the plunger 14 may be resorted to if so desired.

Considering now the means for bringing the bottles 16 up to the nozzles 12 so as to directly discharge therefrom into said bottles, I have found the following devices suitable for the purpose: The two table portions 9, 9, are separated by a gap equal to the width of a transverse table portion 9$^a$ which is arranged immediately below the nozzles 12. This table portion 9ª when in lowered position is in alinement with the table portions 9, 9, and is movable vertically by a frame 17 guided in suitable guides 18. Normally this frame 17 and the table portion 9ª are moved vertically by a lever 19 hinged at one end to the stud 20 on the frame 17 and provided at its other end with a weight 22. The fulcrum 21 is pivoted at 23 to compensate for the rising and falling of the frame 17. The frame 17 is moved in the opposite direction to bring the table 9ª down into alinement with the table portions 9, 9, by a cam 24 operating upon a roller 24ª journaled at the lower end of the frame 17. There is clearance sufficient between this roller 24ª and the cam 24 when in position (Fig. 3) to compensate for the smallest bottle or jar of vertical height. It will be seen that as the cam 24 rotates, the bottles or jars 16 resting upon the table 9ª will be lifted by the action of the weight 22 until the necks of said bottles come into contact with the flanges of nozzles 12, which arrests any further upward movement notwithstanding that the cam 24 continues to rotate and leave the roller 24ª (Fig. 3). In this manner various sizes of bottles or receptacles may be handled automatically with equal facility. The cam 24 is secured to the transverse shaft 25 which also carries the eccentrics 27 before referred to. This shaft 25 is extended through the frame and also carries the cam 49 which has been before referred to for operating the drip slide 15. Motion is given to this shaft 25 by means of a pinion 59 working in connection with the gear 58. The pinion 59 is secured to a transverse shaft 61 which is also provided with a gear 60. Meshing with this gear 60 is a driving pinion 57 which is secured to a shaft 56, said shaft 56 being a power shaft which may be driven by any suitable means (not shown).

Heretofore I have referred to the rotating of the valve 10 through ninety degrees first in one direction and then in the other, and I will now describe the means by which this timed operation is accomplished. The valve 10 is provided at one end with a crank 40, and to this crank is hinged a link 41 the lower end of which is hinged to a lever 42 pivoted to the main frame at 43. This lever 42 is provided with a roller 44 working in a cam 45 said cam secured to the end of the aforesaid shaft 25. It will now be seen that as this shaft 25 and its cam 45 rotate, the valve 10 will be given a rotary movement through ninety degrees, and will have a dwell at the end of each movement, that is to say, a dwell during the time the material is being sucked out of the hopper 3 by the action of the plunger 14 and a dwell during the time that the material is being forced by the plunger 14 into the bottle 16. In other words, there are four cycles of operation, two of which are occupied by the flow of the material and the means for insuring such flow; whereas the remaining two cycles are occupied by bringing the bottles or jars into position for receiving the material, and the operation of the valve 10 for delivering the material to the bottle or jar on the one hand and the lowering and removal of the filled bottles and the operation of the valve 10 for permitting the passage of the material from the hopper to the cylinders on the other hand.

As all of the various devices are operated from the same rotating shaft 25, it is manifest that the timing of the various movable parts of the machine is accurately assured. It is manifest that these various details of the operating mechanism may be greatly modified so long as the specific movements of the essential parts are imparted and in the proper timed relation, and I therefore do not restrict myself to the mechanism which is given by way of example.

Ordinarily, the capacity of the machine for adjustment for different sizes of bottles, shown in the machine illustrated in Figs. 1 to 4, is amply sufficient. Nevertheless, for cases where a greater variation in the height is necessary, I provide means for adjusting the whole table 5, 5, 9, 9, vertically to some extent so that the amount of adjustment to the movable table part 9ª need not be abnormally increased. This modification of the table adjustment is shown in Figs. 5 and 6. In this construction the parts 5, 5, 18 and 9, 9, are all adjustable vertically on the main frame 2. The means employed for this purpose are two toggles 62, the upper ends of which are hinged at 63 to the table structure, while the lower ends are hinged at 64 to the main frame 2. The toggles 62 are arranged in opposite directions and their middle or jointed portions 65 are connected by an adjusting screw-threaded shaft 66 having a hand wheel 67, the screw threads of which are arranged right and left handed. In this manner, the adjustment of the toggles simultaneously will raise or lower the table structure to the degree desired. The sprocket wheels and chains are movable with the table so that there are no changes in respect to them. The lower guide wheels 6ª for the sprocket chains 7 may be carried on adjustable arms 68. As the shaft 25 is journaled in the main frame 2, it is manifest that the cam 24 may be changed to suit the different adjustments and sizes of bottles to be filled where very great variation is required, but instead the roller 24ª may be adjusted lower down on the frame 17 by the stud 24ᵇ and slot 17ª to compensate for the degree of vertical adjustment given to the table in an upward direction so that the cam 24 will operate properly under all conditions of adjustment. When the table is brought to the proper vertical adjustment, it may be steadied by tightening clamping screws 69 so as to relieve any strain upon the toggles. Any other suitable manner of adjusting the table vertically may be employed, if so desired.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent, is:—

1. In a machine of the character stated, the combination of a hopper, a nozzle below the hopper, gravity actuated means to raise a receiving vessel into adjustment and close relation with the nozzle, a cylinder, a valve device between the hopper and the nozzle for shutting off the direct communication between said parts but providing communication alternately from said parts to the cylinder, a plunger in the cylinder for withdrawing the material through the valve into the cylinder and discharging the material from the cylinder through the nozzle, and power devices for controllably lowering the gravity actuated means and receiving vessel away from the nozzle.

2. In a machine of the character stated, the combination of a hopper, a nozzle below the hopper, means to bring a receiving vessel into adjustment under the nozzle and automatically raise the vessel to the nozzle, a cylinder, a valve device arranged horizontally between the hopper and the nozzle and at right angles to the cylinder for shutting off the direct communication between said parts but having a port which is alternately brought into communication with the hopper and with the nozzle and providing communication alternately from said parts to the cylinder, a plunger separate from the valve movable in the cylinder for withdrawing the material from the hopper through the valve into the cylinder and discharging the material from the cylinder through the valve and nozzle, and operative means for rotating the valve alternately in opposite directions and for reciprocating the plunger, the said operations of the valve and the plunger being in timed relation so as to operate alternately.

3. In a machine of the character stated, the combination of a hopper, a plurality of nozzles below the hopper, means to bring a plurality of receiving vessels into adjustment with the nozzles, a plurality of parallel cylinders, a rotary valve device arranged transversely across all of the cylinders and common to them all, said valve device being between the hopper and the nozzles for shutting off direct communication between said parts but having ports which are alternately brought into communication with the hopper and with the respective nozzles and providing communication alternately from said parts to the respective cylinders, a plunger in each of the cylinders for withdrawing the material from the hopper through the valve into the cylinders and discharging the material from the cylinders through the valve and nozzles, operative means for rotating the valve alternately in opposite directions and for simultaneously reciprocating the plungers, the said operations of the valve and the plungers being in timed relation so as to operate alternately, and means for raising and lowering a plurality of the vessels to be filled to and from the nozzles in timed relation whereby the receptacles are in position to receive the material when the plungers discharge it from the cylinders through the nozzles.

4. In a machine of the character stated, the combination of a hopper, a nozzle below the hopper, means to bring a receiving vessel into adjustment with the nozzle, a cylinder, a valve device between the hopper and the nozzle for shutting off direct communication between said parts but providing communication alternately from said parts to the cylinder, a plunger in the cylinder for withdrawing the material through the valve into the cylinder and discharging the material from the cylinder through the nozzle, operative means for rotating the valve alternately in opposite directions and for reciprocating the plunger, the said operations of the valve and the plunger being in timed relation so as to operate alternately, means for automatically raising and lowering the vessels to be filled to and from the nozzles in timed relation whereby the receptacle is in position to receive the material when the plunger discharges it from the cylinder through the nozzle, means for catching the drip from the nozzle when the vessel operating means is lowered, and operative mechanism therefor whereby said means for catching the drip is moved away from under the nozzles when the means for raising the vessels is operated for bringing the vessels in operative relation with the nozzles.

5. In a machine of the character stated, the combination of a hopper, a nozzle below the hopper, means to bring a receiving vessel into adjustment with the nozzle, a stationary cylinder, a valve device in addition to the cylinder and arranged transversely thereto and positioned between the hopper and the nozzle for shutting off direct communication between said parts but providing communication alternately from said parts to the cylinder, a plunger in the cylinder for withdrawing the material through the valve into the cylinder and discharging the material from the cylinder through the nozzle, means for reciprocating the plunger, means for adjusting the extent of said reciprocation to control the amount of material discharged at each operation, and gravity actuated means for raising the vessel to be filled to the nozzle and holding it when filled, and power devices operating upon the means for raising the vessel for positively lowering the vessel away from the nozzle against its tendency to remain elevated, for automatically compensating for various heights of vessels to be filled and whereby vessels differing in size coöperate with the nozzles in the same manner.

6. In a machine of the character stated, a hopper having a nozzle at its lower part, mechanism between the hopper and the nozzle for withdrawing measured quantities of the material from the hopper and discharging it positively from the nozzle, adjustable means for varying the quantity of material so discharged at each operation, gravity actuated means for raising and holding a receiving vessel to definite position with respect to the nozzle during the discharging operation and after it has been completed, and power devices for controlling the time of operation of the gravity actuated means and for positively lowering the said means after the vessel has been filled.

7. The combination of a hopper and a nozzle therefor, means between the hopper and the nozzle for withdrawing a measured quantity of the material from the hopper and positively discharging it through the nozzle, a table for the vessels to be filled, endless conveyers for moving the vessels along the table successively into position beneath the nozzle, a vertically movable table portion for raising the vessel to be filled upward to definite position with respect to the nozzle, a gravity actuated means for moving the table portion and the vessel vertically whereby vessels of various sizes may be adjusted to the nozzle automatically, and cam devices for positively moving the table portion downward to alinement with the table and against the action of the gravity actuated means.

8. In a machine of the character stated, the combination of a hopper, a plurality of nozzles below the hopper, a plurality of cylinders, a rotary valve device arranged transversely across all the cylinders and common to all of them, said valve device being between the hopper and the nozzles for shutting off direct communication between said parts but having ports which are alternately brought into communication with the hopper and with the respective nozzles and providing communication alternately from said parts to the respective cylinders, a plunger in each of the cylinders for withdrawing the material from the hopper through the valve into the cylinders and discharging the material from the cylinders through the valve and nozzles, operative means for rotating the valve alternately in opposite directions and for simultaneously reciprocating the plungers, a table arranged at a lower level than the nozzles, traveling means on the table to feed a plurality of receiving vessels into adjustment with the nozzles, devices for intermittently operating the feeding means for the vessels, and adjusting means for adjusting the table and feeding means simultaneously to or from the nozzles.

9. The invention according to claim 8, further characterized by elevating means carried by the table for raising the vessels to be filled to a higher elevation than the level of the table and to definite position with respect to the nozzles, and means in addition to the adjusting means for the table for controlling the movement of the elevating means carried by the machine.

10. The invention according to claim 8, wherein the means for adjusting the table consists of two oppositely directed toggles and an adjusting screw for drawing the toggles toward or from each other.

In testimony of which invention, I hereunto set my hand.

JOHN F. GEYER.

Witnesses:
E. W. SMITH,
KATHRYN A. SUMMERS.